Patented Feb. 16, 1932

1,845,314

UNITED STATES PATENT OFFICE

JOSEPH V. MEIGS, OF CHESTNUT HILL, MASSACHUSETTS, ASSIGNOR TO MEIGSOID CORPORATION, OF JERSEY CITY, NEW JERSEY, A CORPORATION OF NEW JERSEY

RESINOUS PRODUCT AND PROCESS OF MAKING THE SAME

No Drawing.    Application filed November 25, 1921. Serial No. 517,721.

This invention relates to a class of resinous bodies which will be more fully hereinafter described, including the members of that class intended to serve as substitutes for shellac and kindred uses.

The invention employs among other materials two classes of raw materials, viz:

Class 1. Carbohydrate, such as fructose or levulose, including sucrose or sucrose containing substances which yield levulose under the conditions contemplated by the process of the invention.

Class 2. Phenolic bodies, such as: phenol or carbolic acid, and its homologues the cresols and xylenols: naphthol and its homologues: resorcinol: thymol and carvacrol: and other members of the phenol family or genus.

When brought together under suitable condition it appears that members of the carbohydrate of the type indicated and phenolic bodies show ability to react and form resinous bodies, particularly with the aid of reaction promoting or catalytic agents.

The term reaction promoting agents means forms of energy capable of initiating and (or) maintaining reaction. The energy may be chemical energy in the form of a chemical substance or it may be heat energy. Mechanical energy, such as pressure, or radiant energy might be employed.

The term reaction promoting agent further comprises a combination of two or more forms of energy. For example, reaction between levulose or a levulose yielding carbohydrate and a phenolic body may be brought about by the combined action of heat and a chemical substance (e. g. a mineral acid) or by the action of water heat and a chemical substance (i. e. one other than the carbohydrate or phenolic body.)

The resinous body or bodies produced will in general have different properties (e. g. consistency i. e. hardness or softness; tensile strength i. e. toughness or brittleness etc.,) depending on the raw materials used, their concentration during reaction, the nature of after-treatments to which the resinous body may be subjected and to other conditions.

The resinous body may resemble shellac in hardness, toughness, smoothness, glassy surface etc., or it may be akin in some of its properties to other resins, such as copal, damar, kauri and the like: or it may be a soft balsamic mass suggesting Canada balsam in its consistency.

This discussion will serve to make clear the scope of the term "resinous bodies" as used in the specification and claims.

The invention has nothing in common with the well known resins produced by the action of phenols on formaldehyde.

It is thought that the present invention may comprise a process somewhat akin to that which goes on in, and upon the body of the insect which produces natural shellac: and it was the effort on the part of the inventor to determine the nature of this metabolic process which gave rise to the present invention.

An example will illustrate one of the various methods of carrying the invention into effect.

*Example*

I dissolved 150 grams of cane sugar in 20 cc. of water and heated the resulting syrup to its boiling point, about 114° C. I then added 40 grams of phenol crystals. The resulting mixture, at 117° C., formed a clear solution and boiled at about that temperature.

I provided with a reflux condenser the flask containing this syrup and boiled the same. On the addition of one cc. of strong hydrochloric acid, a dark colored product formed immediately. Boiling was continued for one and one-quarter hours, during which time the boiling point of the solution (liquid) rose to 121° C. and then slowly decreased to about 113° C.

On cooling, the formation of at least two products was noted (a) a thick, viscous, almost black, tarry product and (b) a less viscous, comparatively thin liquid.

I separated products (a) and (b) that is, removed (a) from the reaction or digestion mixture and boiled it with water, which had the effect of further removing from (a) products of the nature of those contained in (b)

such as any unchanged phenol or sugar or other extractives.

I then placed (a) in a shallow dish and heated and melted it, using a hot air bath for the purpose.

It was thus apparent that by supplying energy to (a) in this manner, that the latter appeared to harden, for previous to heating, (a) was soft and balsamic in consistency whereas upon cooling after the heat treatment, (a) was hard and tough and possessed a shiny, glassy surface.

As disclosed in the example cited herewith, the resinous body may be prepared in a reactive condition, or potentially reactive form, i. e. in such condition that it is still capable of change into a harder form, as for example by the application of heat or otherwise.

The energy thus supplied to (a) may have been absorbed as heat energy or as heat and chemical energy, i. e. (a) may have been oxidized by atmospheric oxygen.

When glucose is added to melted phenol the latter acts as a solvent for the glucose and the addition of hydrochloric acid brings about the formation of a water insoluble product which separates from the remainder of the reaction mixture.

Melted phenol is also a solvent for sucrose, e. g. cane sugar. The solvent power of phenol for carbohydrates appears to be increased by an increase in temperature and by the presence of water.

Water may play an important part in reactions between phenols and carbohydrates. Even when not intentionally added, water may be present in the reaction due to the presence of water in many commercial carbohydrates and phenolic bodies, or to other causes.

The resinous products formed by the interaction of carbohydrates, e. g. sucrose, and phenolic bodies, e. g. phenol and reaction promoting agents seem to show the property of skin formation on exposure to air. It would seen that such bodies are capable of being oxidized.

The product prepared from sucrose as described in the example (above) when spread out in a thin layer was solidified and hardened at room temperature, presumably, by oxidation.

This property seems further to render the present process akin to that by which shellac is formed in nature since it is believed that the shellac producing insect excretes a mass which is hardened by exposure.

To summarize, the present invention may be carried into effect by maintaining intimate contact between a phenolic body and a saccharide with the aid of reaction promoting agents or agent. Energy, such for example as heat may be supplied to promote reaction. When sucrose is heated with a phenol in the manner described, the sucrose is split into levulose and dextrose. Dextrose will react with the phenol to form a resinous body but not at the temperatures as low as those at which the mixture of sugar, water and phenol will boil. To bring about the reaction with dextrose the water must be removed and the material raised to higher temperatures. The fact that a reaction can be obtained by boiling cane sugar, water and phenol under a reflux condenser indicates that it is the levulose which reacts with the phenol in this case.

When it appears that the reaction has ceased or come to equilibrium, the resinous product formed may be removed from the remainder of the reaction mixture and purified. The resinous product may then be submitted to the action of energy for example heat and (or) chemical energy (e. g. exposure to air) to harden the resinous product.

The attainment of equilibrium or cessation of resin forming reaction may be determined by removing a sample of the reaction mixture, cooling (if heated), separating the resinous product and observing whether resin forming action is still proceeding or may be induced to proceed in the sample from which the resinous product has been removed.

The heat referred to in the specification and claims may comprise any energy employed to raise the temperature of the reaction mixture or resinous products above normal room temperature.

"Digesting" means in the present connection intimately commingling two or more substances with a view to causing reaction between them.

The saccharides may be divided into at least three classes, viz. mono-, di-, and polysaccharides. Glucose is a typical monosaccharide, cane sugar (sucrose) beet sugar and maltose are considered to be disaccharides and the still more complex saccharides, such as raffinose, dextrin and starch, as well as gums such for example as gum arabic, are often termed polysaccharides.

What I claim is:

1. Process of making a resinous substance which consists in reacting by heat sucrose and a phenol.

2. Process of making a resinous substance which consists in reacting by heat, in the presence of a catalyzing acid, sucrose and a phenol.

3. Process of making a resinous substance which consists in boiling sucrose, a phenol and water.

4. Process of making a resinous substance which consists in boiling sucrose, a phenol, an acid and water.

5. Process of making a resinous substance which consists in boiling sucrose, a phenol, an acid and water, condensing the water and phenol vapors and returning the same to the batch.

6. Process of making a resinous substance which consists in reacting by heat sucrose and a phenol, removing the insoluble substance from the liquid and heating the same to harden it.

7. Process of making a resinous substance which consists in reacting by heat, in the presence of a catalyzing acid, sucrose and a phenol, removing the insoluble substance from the liquid and heating the same to harden it.

8. Synthetic resin consisting of the substantially water insoluble reaction product of sucrose and a phenol.

9. Synthetic resin consisting of the substantially water insoluble reaction product of sucrose, an acid and a phenol.

JOSEPH V. MEIGS.